W. D. KIRKPATRICK.
CULTIVATOR ATTACHMENT.
APPLICATION FILED NOV. 19, 1920.

1,431,464.                                     Patented Oct. 10, 1922.

Inventor
WILLIAM D. KIRKPATRICK

WITNESSES

By

Attorney

Patented Oct. 10, 1922.

1,431,464

UNITED STATES PATENT OFFICE.

WILLIAM D. KIRKPATRICK, OF ITASCA, TEXAS.

CULTIVATOR ATTACHMENT.

Application filed November 19, 1920. Serial No. 425,136.

*To all whom it may concern:*

Be it known that I, WILLIAM D. KIRKPATRICK, a citizen of the United States, residing at Itasca, in the county of Hill and State of Texas, have invented certain new and useful Improvements in Cultivator Attachments, of which the following is a specification.

This invention relates to cultivator attachments and has for its object the provision of a soil engaging member which cooperates with the cultivator to completely prepare the soil to receive the seed, thereby eliminating the double operation of first plowing and then cultivating the soil.

Another object of the invention is to provide an attachment of the above nature which may be conveniently connected to standard types of cultivators without interfering with the use of the latter.

The above and other objects of this invention will be in part described and in part understood from the following description of the present preferred embodiment of the invention taken in connection with the accompanying drawings, wherein.

Figure 1:
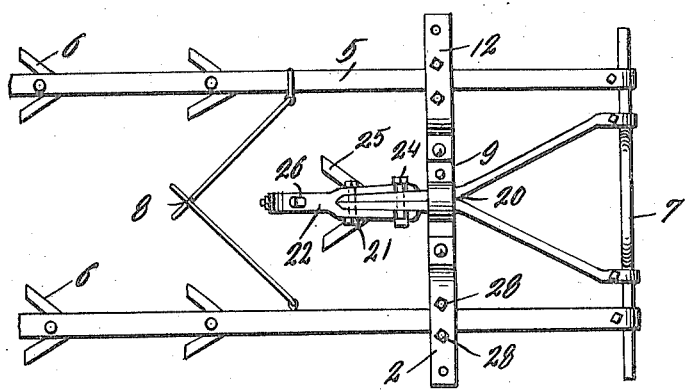
Fig. 1, is a top plan view of the device constructed in accordance with this invention.
Figure 2:
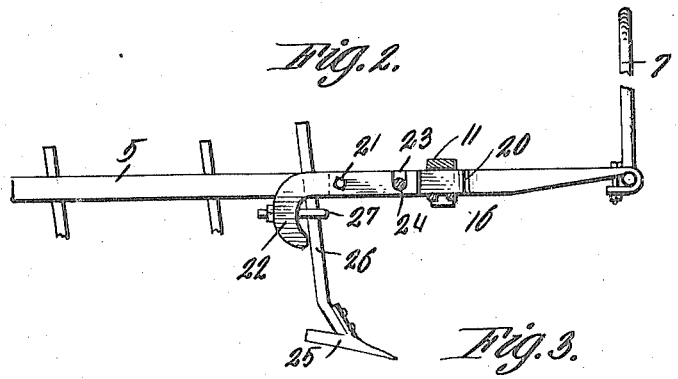
Fig. 2, is a side elevational view partly in section, and part thereof being broken away.

In the drawings, a pair of cultivator beams 5 are shown which have cultivators 6 connected thereto in the usual way. The front ends of the beams are detachably connected with the spindles of the cultivator arch 7, which may also be of the usual or any desired configuration. A hobble member 8 is connected with said beams approximately midway the ends of the latter to limit outward movement of the latter for a purpose hereinafter set forth.

Figure 4:
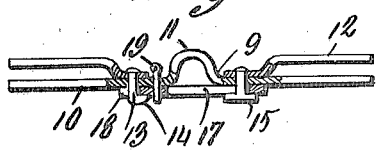
Fig. 4, is a side elevational view, partly in section of the presser bar.
Figure 3:
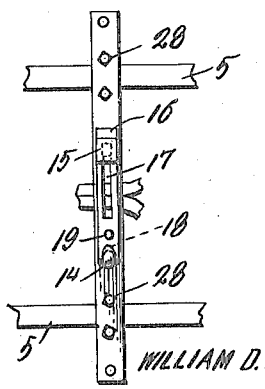
Fig. 3, is a detail fragmentary bottom plan of the presser bar, illustrating its manner of connecting.

The device of this invention consists especially of a presser bar generally designated 9 and consists of a main body bar 10 which is arched midway its ends as indicated at 11. A pair of straps 12 are secured to the top face of the body bar, each of said straps having one end thereof engaged adjacent the arched end and the opposite end thereof offset upwardly so as to lie in parallelism with the outer ends of the bar 10. One of said straps is secured by a stud 13 which extends through the body bar and is equipped with an elongated head 14 which lies in spaced relation to the lower face of the body bar. An inverted T-shaped stud 15 connects the opposite strap to said body bar 10, the head of the T being spaced from the lower face of the body bar. An elongated locking link 16 is slidably mounted on the lower face of the body bar 10 and is provided with an elongated slot 17 through which the shank of the stud 15 extends. The head of said stud is engaged with the outer face of said link to hold the latter from displacement. The end of the link 16 opposite to that which is engaged by the stud 15 is provided with a semicircular recess as indicated by the dotted line 18 in Fig. 3. This recess is engageable with the shank of the stud 13 and is held in engagement therewith by a locking pin 19 which extends through the body bar and into the locking link as illustrated in Fig. 4.

The free ends of a plow beam 20 are connected with the spindles of the arch 7 within the cultivator beams 5. This beam extends through the arch 11 of the body bar and is pivotally connected by means of a bolt 21 to the foot 22 of the beam. Said foot is bifurcated at one end and the branches of the bifurcation straddle across the inner end of the beam 20. The upper edges of said branches are recessed as indicated at 23, adjacent the free terminals thereof, adapted for the reception of a bolt 24 which extends transversely through the beam 20. This bolt has a nut mounted on its outer end whereby the branches are normally held snugly in engagement with the opposite side of the beam 20. A plow 25 of any suitable design is provided which has upstanding therefrom a shank 26, the latter extending through an eye-bolt 27, which extends through the bill of the shoe 22 and is detachably connected therewith. The shank may be adjusted in the shoe in order to vary the depth of penetration of the plow 25. As soon as undue pressure is exerted on the latter, such, for instance, as by contact with a root, stone, or the like, the branches of the bifurcation will be disengaged from the bolt 24 and the shoe 22 permitted to swing on its axis 21.

If desired, the beams 5 may be permitted to ride freely between the body bar 10 and the straps 12, undue lateral movement of said beams being prevented by the hobble 8. However, when it is desired to furrow the soil, bolts 28 are used, one being mounted on each side of each beam in order to hold the same from lateral movement as illustrated to advantage in Fig. 1. If desired, a series of bolt openings may be formed in the presser bar so as to permit a greater range of adjustment of the beams.

By connecting the beams to the presser bar in a manner as described above, the plow 25 will be pressed downwardly into the soil by the pressure of the beams 5. Since the plow operates in front of the cultivators 6, it will be obvious that the soil will be simultaneously plowed and cultivated. When it is desired to disengage the plow beam 20 the pin 19 is removed and the locking link 16 retracted across the stud 15, thereby opening the mouth of the arch 11.

What is claimed is:

1. A cultivator attachment, in combination with an arch having cultivator beams and a plow beam connected thereto, a presser bar including an integral bar body provided with a relatively small inverted U-shape arch which snugly embraces said plow beam, means to hold said plow beam in said arch, and a pair of straps the inner end of each of which is secured to said bar adjacent its U-shape arch, the opposite ends of the straps being arranged in spaced parallel relation to the bar to receive the cultivator beams between said bar and straps substantially as described.

2. A cultivator attachment in combination with an arch having cultivator beams and a plow beam connected thereto, a presser bar arched midway its ends and receiving the plow beam in the arch, the opposite ends of said bar being extended into engagement with the cultivator beams, and means to secure said beams from displacement on the bar.

In testimony whereof I affix my signature in presence of two witnesses.

WILLIAM D. KIRKPATRICK.

Witnesses:
PAT E. HOODS,
S. M. FILER.